(No Model.) 3 Sheets—Sheet 3.

T. MEYER.
CULTIVATOR.

No. 402,268. Patented Apr. 30, 1889.

WITNESSES:

INVENTOR.
T. Meyer
BY
Munn & Co.
ATTORNEYS.

UNITED STATES PATENT OFFICE.

THEODORE MEYER, OF AMITY, IOWA, ASSIGNOR OF ONE-HALF TO FREDERICK MEYER, OF SAME PLACE.

CULTIVATOR.

SPECIFICATION forming part of Letters Patent No. 402,268, dated April 30, 1889.

Application filed May 1, 1888. Serial No. 272,455. (No model.)

*To all whom it may concern:*

Be it known that I, THEODORE MEYER, of Amity, in the county of Scott and State of Iowa, have invented a new and useful Improvement in Cultivators, of which the following is a full, clear, and exact description.

My invention relates to an improvement in cultivators, and has for its object to provide an implement of this class having a harrow attachment of simple and durable construction wherein a single group or a series of groups of rotary teeth may be readily adjusted vertically and also laterally to avoid contact with the plants not in line, and wherein also the said teeth may be rotated while being so adjusted.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
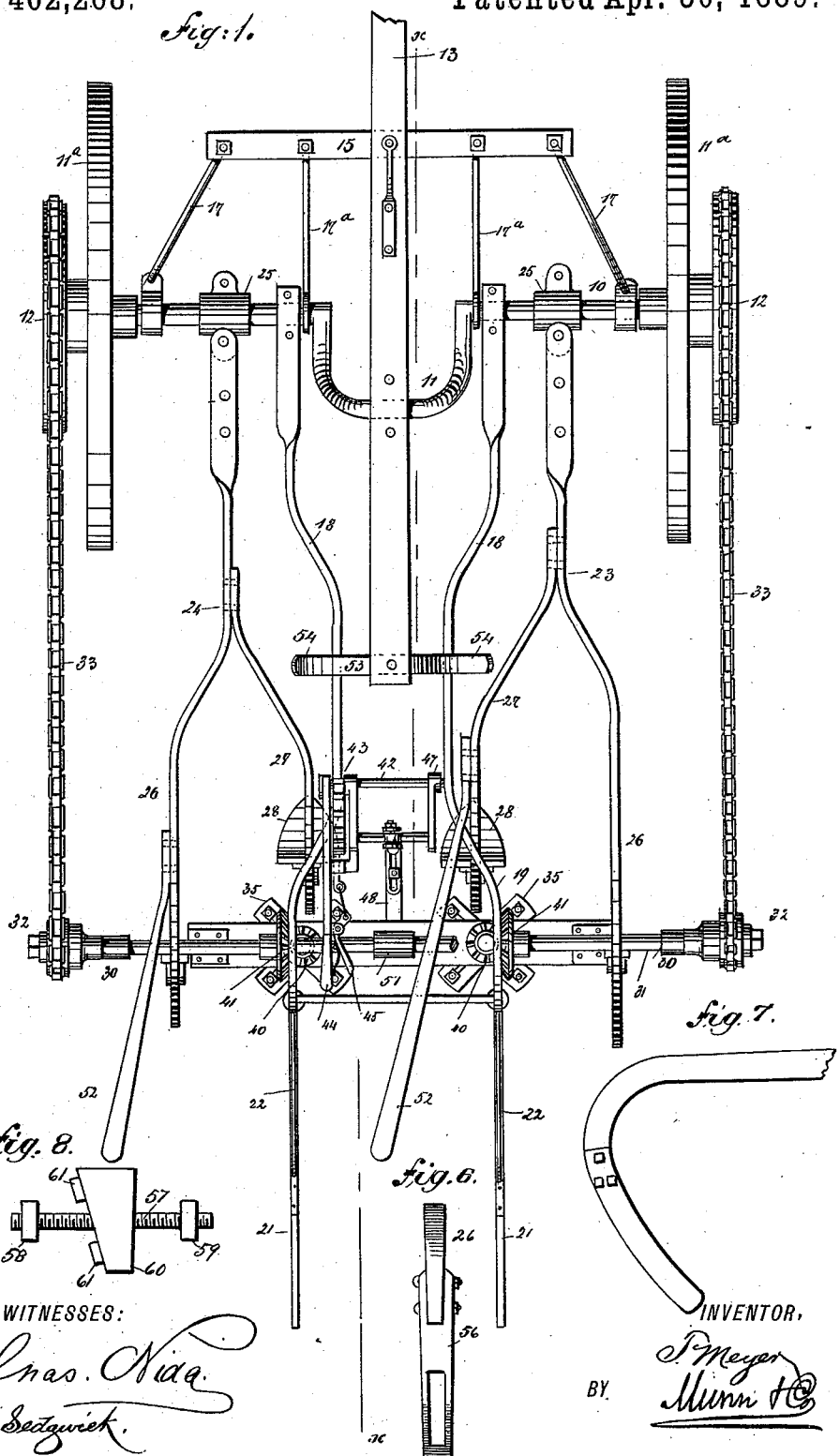
Figure 2:
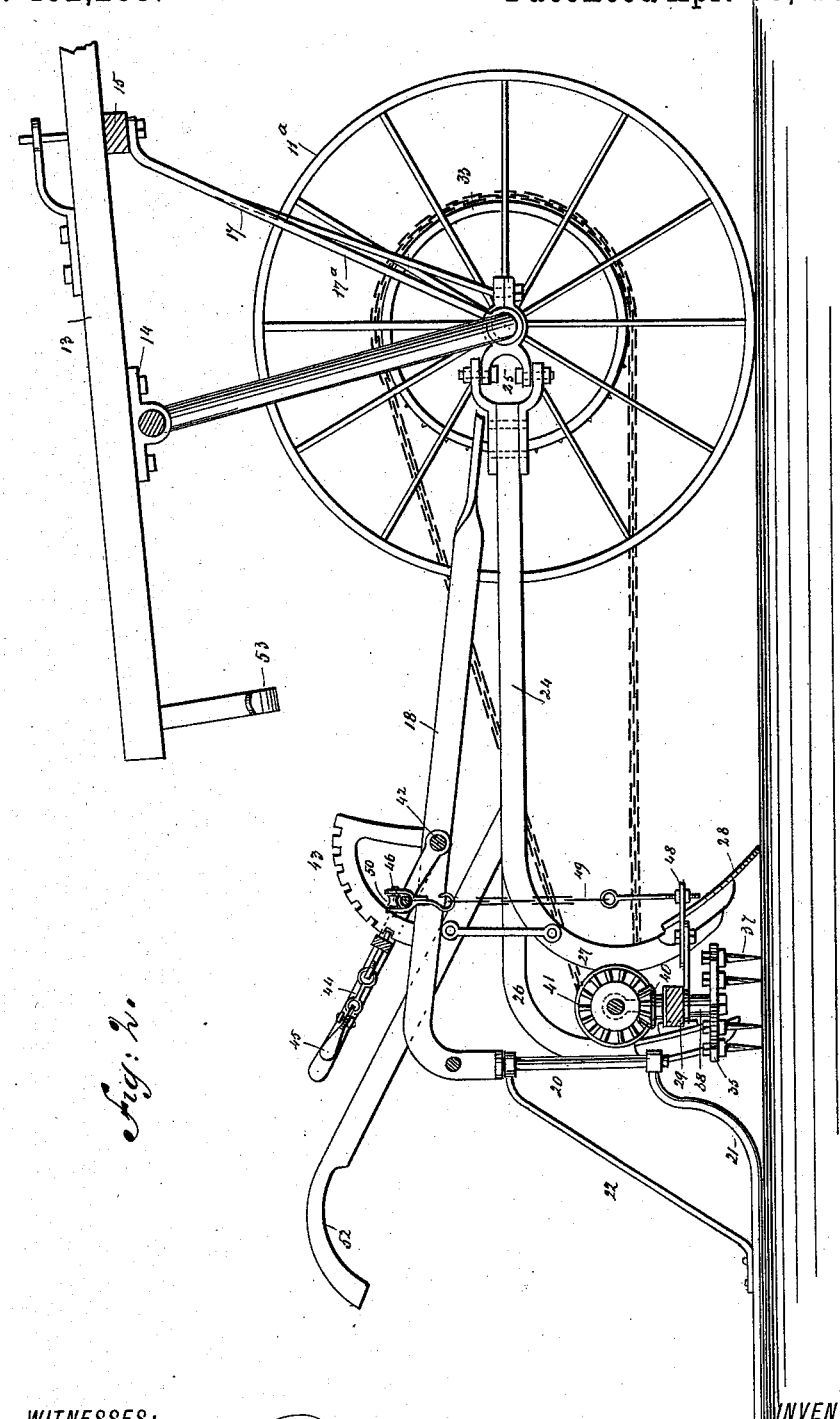
Figure 3:
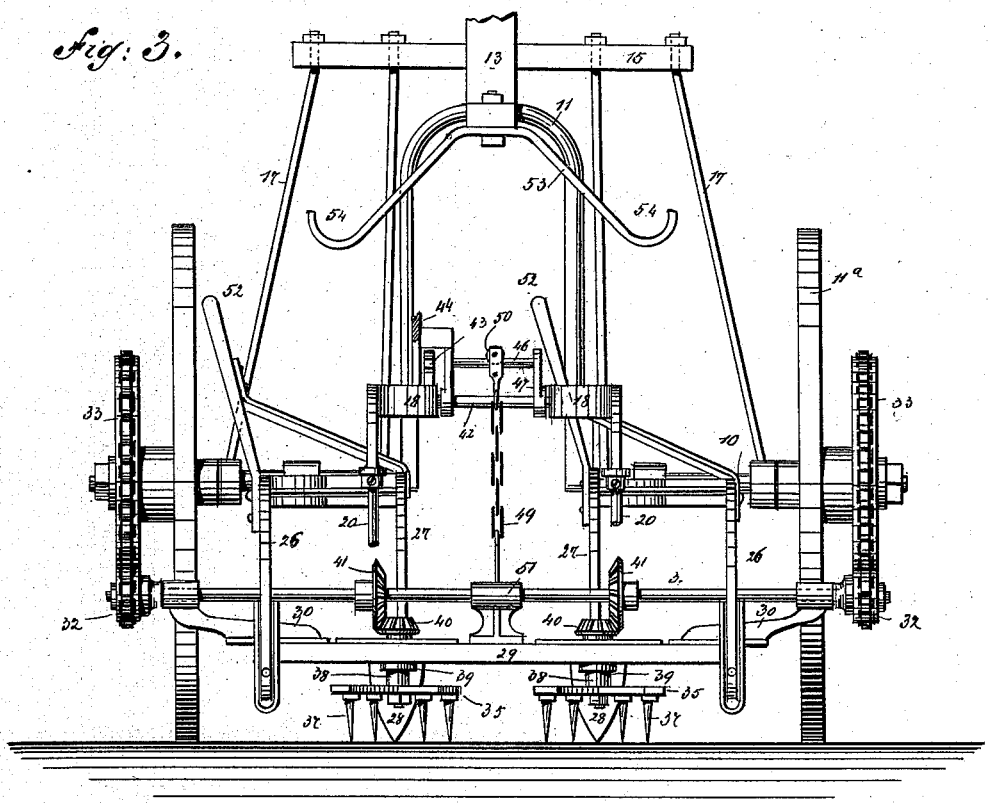
Figure 4:
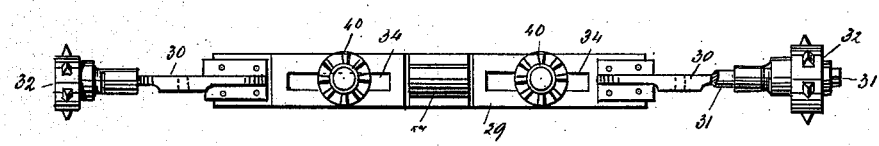
Figure 5:
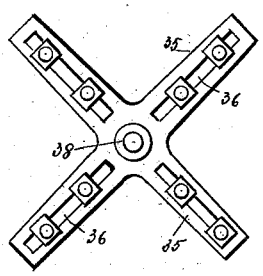

Figure 1 is a plan view of the implement. Fig. 2 is a central longitudinal section on line *x x* of Fig. 1. Fig. 3 is a rear view. Fig. 4 is a plan view of the drag-bar, and Fig. 5 is a similar view of one of the tooth-frames. Fig. 6 is a rear view of an ordinary cultivator-sleeve attached to the extremity of the longer member of the drag-bar. Fig. 7 is a side view of the same, and Fig. 8 is a side view of the intermediate block and threaded bolt and nuts.

In carrying out the invention the axle 10 is centrally, rearwardly, and upwardly bent to form a yoke, 11, and provided at each end with drive-wheels 11ª, loosely mounted thereon, to the outer hubs of which drive-wheels a sprocket-wheel, 12, is attached.

The yoke 11 is adapted to support the tongue 13 of the implement, and to that end is secured upon the under side of the tongue in bearings 14, as shown in Fig. 2. The tongue is further sustained in a horizontal position by means of a cross-bar, 15, and a series of forwardly-extending braces, 17 17ª, which braces are respectively attached to the axle 10 and to the under side of the cross-bar 15, as clearly shown in Figs. 1 and 2.

The main frame 18 of the implement consists of two parallel arms secured at their forward ends to the axle 10 at each side of the central yoke, 11, by clamp-couplings, the said arms being carried rearward a short distance in a straight line and then brought inward toward one another, whereupon they again assume straight and parallel lines and rearward of the center are outwardly bent, as shown at 19, and then vertically downward to form the arms 20, to which arms runners 21 are secured.

The runners 21 consist of a suitable bar curved downward from the arm 20 and extending in a horizontal line a distance to the rear, the said runners being adapted to sustain a series of rotary teeth, hereinafter described, in a given position whether the ground be hard or soft. The runners are held in proper position by means of a brace, 22, secured to the upper horizontal surface, and likewise to the upper end of the frame-arm 20, as best shown in Fig. 2.

Adjustable drag-bars 23 and 24 are connected to the shaft 10, at each side of the frame 18, by means of collars 25, held to revolve upon said shaft, to which collars the forward ends of the drag-bars are pivoted, as best illustrated in Fig. 1. By this means the drag-bars 24 and 23 may rotate upon the shaft through the collar 25 and have a lateral movement by means of their pivotal attachment to said collar. The rear ends of the drag-bars 23 and 24 are bifurcated, the outer members, 26, of which are the longest, and curve downward to the rear of the machine in substantial alignment with the arms 20 of the main frame. The shorter members, 27, are likewise curved downward, and to their extremities shovels 28 are secured, which shovels are adapted to turn the ground in the direction of the plants and in line with the same as the implement is drawn forward.

My device is intended as an attachment which may be applied, when desired, to an ordinary two-wheeled straddle-row cultivator; hence the only parts of such cultivator which I dispense with are the shovels, shovel-blocks, bolts, and nuts, which, in a cultivator, are connected with the longer members of the drag-bar. Such longer member, 26, of the drag-bar of a cultivator is always provided with a sleeve substantially the same in form as 56, through the slot in which a bolt passes, secured by a nut to hold the shovel-block and shovel. I utilize such sleeve 56, in connection with the wedge-shaped block 60, Fig. 8, for securing the cross-bar 29 to such longer member, 26, of the drag-bar. The wedge-shaped block 60, upon its rear face, has two projections, 61, which enter the slot in sleeve 56 on its front face, such block being perforated to accommodate threaded bolt 57, which bolt accommodates threaded nuts 58 and 59. Wedge-shaped block 60 is placed against the front face of sleeve 56, so its projections 61 will enter the slot of said sleeve. Bolt 57, also extending through said slot, is secured therein by nut 58 against the rear face of said sleeve. Brackets 30, attached to cross-bar 29, have suitable perforations through which bolt 57 also passes, and is secured by nut 59 against the front side of said bracket, thus placing wedge-shaped block 60 between the front face of said sleeve and the rear side of said bracket. By adjusting nuts 58 and 59, so slight play may be given such wedge-shaped block, the cross-bar 29 may be swung or moved laterally with the drag-bars sufficient for operative purposes.

To the outer ends of said cross-bar, upon the upper surface, brackets 30 are secured, adapted to extend upward at each side, in which brackets a transverse shaft, 31, is journaled. The ends of the drive-shaft projecting beyond the plane of the drive-wheels are each provided with an attached sprocket-wheel, 32, as best shown in Fig. 3, which sprocket-wheels are connected by chain belts 33 with the sprocket-wheels 12, attached to the drive-wheels 11.

The cross-bar 29 is provided at each side of the center with longitudinal slots 34, which slots are preferably incased by a metal plate secured to the upper surface of the said cross-bar. The cross-bar 29 is adapted to carry one or a series of tooth-frames, 35, (best shown in Figs. 3 and 5,) which tooth-frames preferably consist of four arms radiating from a common center, each of which arms is provided with a longitudinal slot, 36, and through said slots from the under side the shanks of two or more teeth, 37, are projected, being provided upon the under side of the frame with a suitable collar and a lock-nut upon the upper projecting end, which construction is clearly illustrated in the aforesaid Fig. 5.

The tooth-frames are held in suspension through the medium of a central post, 38, which post is projected upward through the slots 34 of the cross-bar, being prevented from passing upward too far by collars 39 and provided upon the upper end with a bevel-pinion, 40. (Illustrated in Fig. 3.) The bevel-pinions 40 of the tooth-frames are adapted for engagement with the bevel-gear 41, rigidly secured to the drive-shaft 31, whereby the said frames are rotated, motion being imparted to the drive-shaft through the medium of the chain belt 33.

It will be observed that by reason of the slots in the sleeves at the extremity of the adjustable drag-bars 23 and 24 the cross-bar is capable of lateral as well as vertical adjustment, for a reason hereinafter stated.

Between the bent surface of the main frame 18 the several sections of said frame are connected by a transverse bar, 42, and adjacent to said transverse bar a rack, 43, is secured to one of the frame-sections, as illustrated in Figs. 1 and 2. A lever, 44, is pivoted upon the bar 42 near the rack, which lever is adapted to travel over said rack, and is provided with a smaller attached lever, 45, which latter lever controls the movement of the main lever upon the rack. From one surface of the main lever 44 a rod, 46, is projected, and from said rod an arm, 47, is carried at right angles downward to a pivotal connection with the said fixed rod 42, whereby a crank is formed.

From the center portion of the cross-bar 29 a horizontal arm, 48, is forwardly projected, which arm is slotted to receive one end of a chain, 49, the other end of said chain being attached to the crank-rod 46, as best shown in Fig. 3. The attachment of the chain with the crank-rod 46 is effected by means of a clevis, which clevis is provided with a grooved friction-roller, 50, adapted to travel upon the crank-rod, whereby a lateral movement of the clevis is permitted.

The drive-shaft 31, in addition to the bearings afforded by the brackets 30, is also supported by a simple bearing, 51, secured to the upper surface of the cross-bar, and to the outer surface of the longer member of the adjustable drag-bar 23 and the inner surface of the shorter member of the adjustable drag-bar 24 handles 52 are attached, whereby the implement is guided by the operator.

To the rear end of the tongue 13 a retaining-bar, 53, is secured, which bar is carried downward at each side and bent upward at the extremities to form the hooks 54, the purpose of which bar is to retain the respective adjustable drag-bars 23 and 24 in an elevated position when the implement is not adapted for use as a cultivator. When the drag-bars 23 and 24 are thus elevated, the cross-bar 29 and the drive-shaft 31 are likewise elevated, being carried upward by the said drag-bars.

In operation, when it is desired to elevate or lower the tooth-frames, the lever 44 is carried either to the rear or toward the front, by which movement the crank-rod 46 is likewise raised or lowered, and by reason of the attachment with said crank-rod of the cross-bar the latter follows the movement of the former. As lateral play is provided for the cross-bar, the drive-shaft, and the connecting-chain 49, when the implement is used in the field, it will be found that the several tooth-frames, which are adapted to harrow the ground between the rows of plants, can be prevented from striking any plant which may be out of line, as by moving the handles to the right or left, as occasion may demand, the position of the said tooth-frames may be governed to a nicety and be made to pass upon either side of a single plant or plants, as found desirable.

In elevating the tooth-frames to run along the road or to avoid tall plants, the lever 44 is thrown forward; or, in case high elevation is desired, several links of the chain can be taken up, and this adjustment can also be used to readily and nicely adjust the depth of cultivation.

The cross-bar may be, if desired, and preferably is, so connected with the cultivator drag-bars that the frames may be moved in any direction laterally.

Having thus described my invention, what I claim as new, and desire to secure by Letters Patent, is—

1. In a cultivator, the combination, with the axle and drive-wheels and a central frame, of vertically and laterally adjustable drag-bars attached to said axle, having bifurcated ends of unequal length, shovels secured to the shorter member of said drag-bars, a cross-bar supported by the longer members, rotary toothed frames carried by said cross-bar, and means, substantially as described, for revolving said toothed frames from the drive-wheels, as and for the purpose specified.

2. In a cultivator, the combination, with the axle and drive-wheels, a central frame, runners attached to said frame at the rear, and vertically and laterally adjustable drag-bars mounted upon the axle, having bifurcated ends of unequal length, of shovels attached to the shorter members of the drag-bars, a horizontal cross-bar supported in the longer members, rotary toothed frames carried by said cross-bar, and means for rotating the toothed frames and elevating the said drag-bars, as and for the purpose specified.

3. In a cultivator, the combination, with the axle, the drive-wheels, sprocket-wheels attached to the latter, a central frame provided with rearwardly-extending runners, and vertically and laterally adjustable drag-bars mounted upon said axle, having downwardly-curved bifurcated rear ends of unequal length, of shovels attached to the shorter members of the drag-bars, a horizontal vertically-adjustable cross-bar supported in the longer members, rotary toothed frames carried by said cross-bar, a horizontal drive-shaft geared to rotate said toothed frame, sprocket-wheels keyed upon said shaft, and an endless belt connecting the sprocket-wheels of the shaft and drive-wheels, as and for the purpose specified.

4. In a cultivator, the combination, with the axle, a frame secured to said axle, laterally and vertically adjustable drag-bars mounted upon the same, provided with bifurcated downwardly-curved rear ends of unequal length, and shovels secured to the shorter members, of a horizontal cross-bar supported in the longer members of the frame, rotary toothed frames carried by the cross-bar, a rack secured to the main frame, a lever pivoted to said frame engaging the rack, a crank-arm projected from said lever, and a chain-connection between the cross-bar and crank-arms, substantially as shown and described.

5. In a cultivator, the combination, with the axle, a frame secured at each side the center of the axle, laterally and vertically adjustable drag-bars pivoted upon the same at each side of the frame, provided with forked downwardly-curved rear ends of unequal length, and shovels secured to the shorter members, of a horizontal cross-bar supported by the longer members of the arms, having vertical play, toothed frames carried by said cross-bar, a rack secured to the main frame, a lever pivoted to said frame engaging the rack, a crank-arm projected from said lever, and a chain having lateral movement upon the crank-arm secured to said cross-bar, substantially as shown and described.

THEODORE MEYER.

Witnesses:
A. J. HIRSCHL,
WM. STERNBERG.